Aug. 28, 1928.
J. N. SHANKS
1,682,352
SELF LOADING VEHICLE
Original Filed May 5, 1926   2 Sheets-Sheet 1
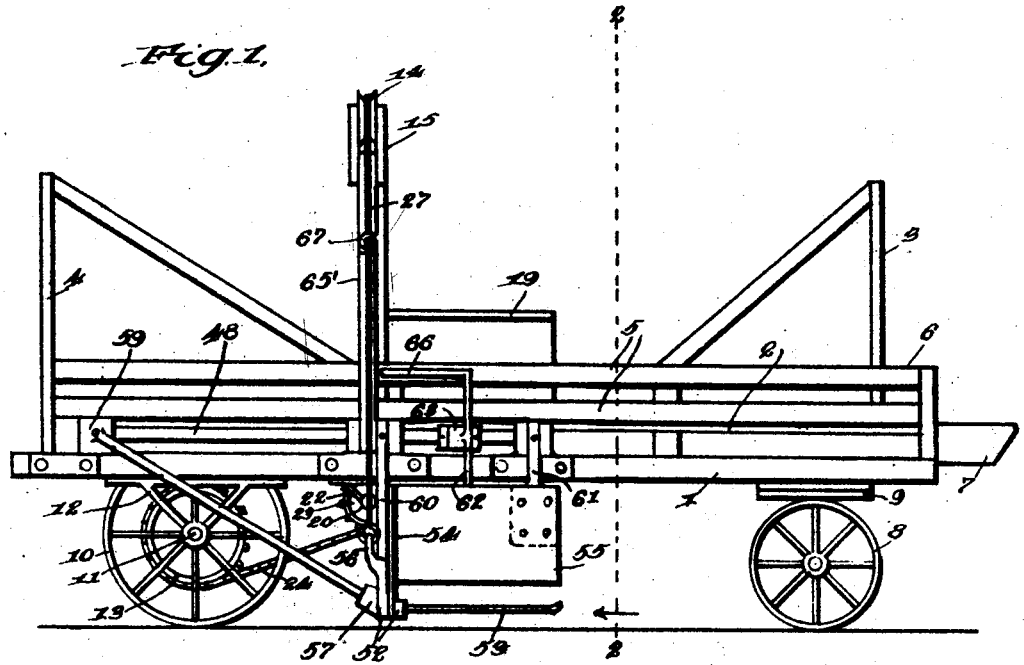
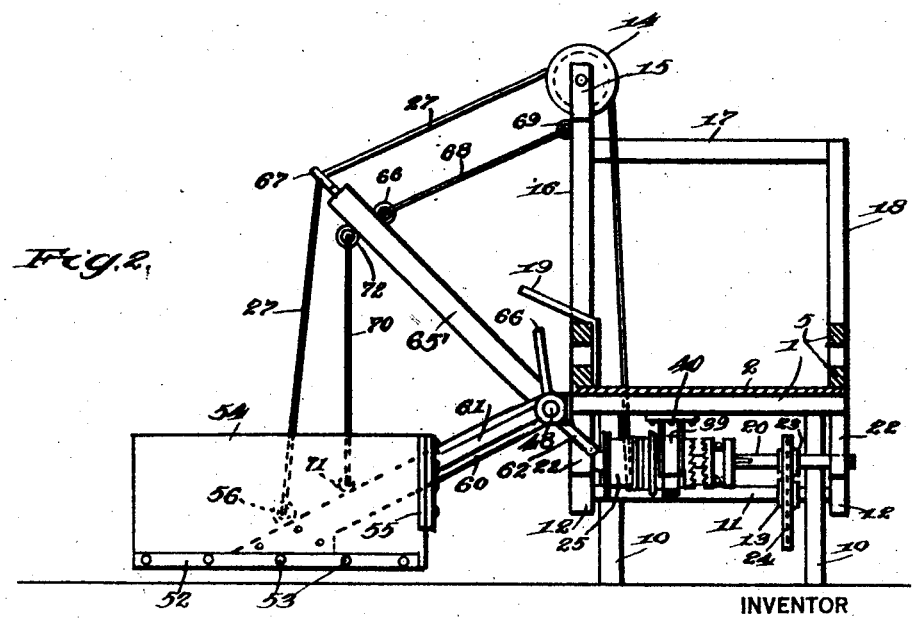
INVENTOR
John N. Shanks
BY
Carl H. Crawford
ATTORNEY

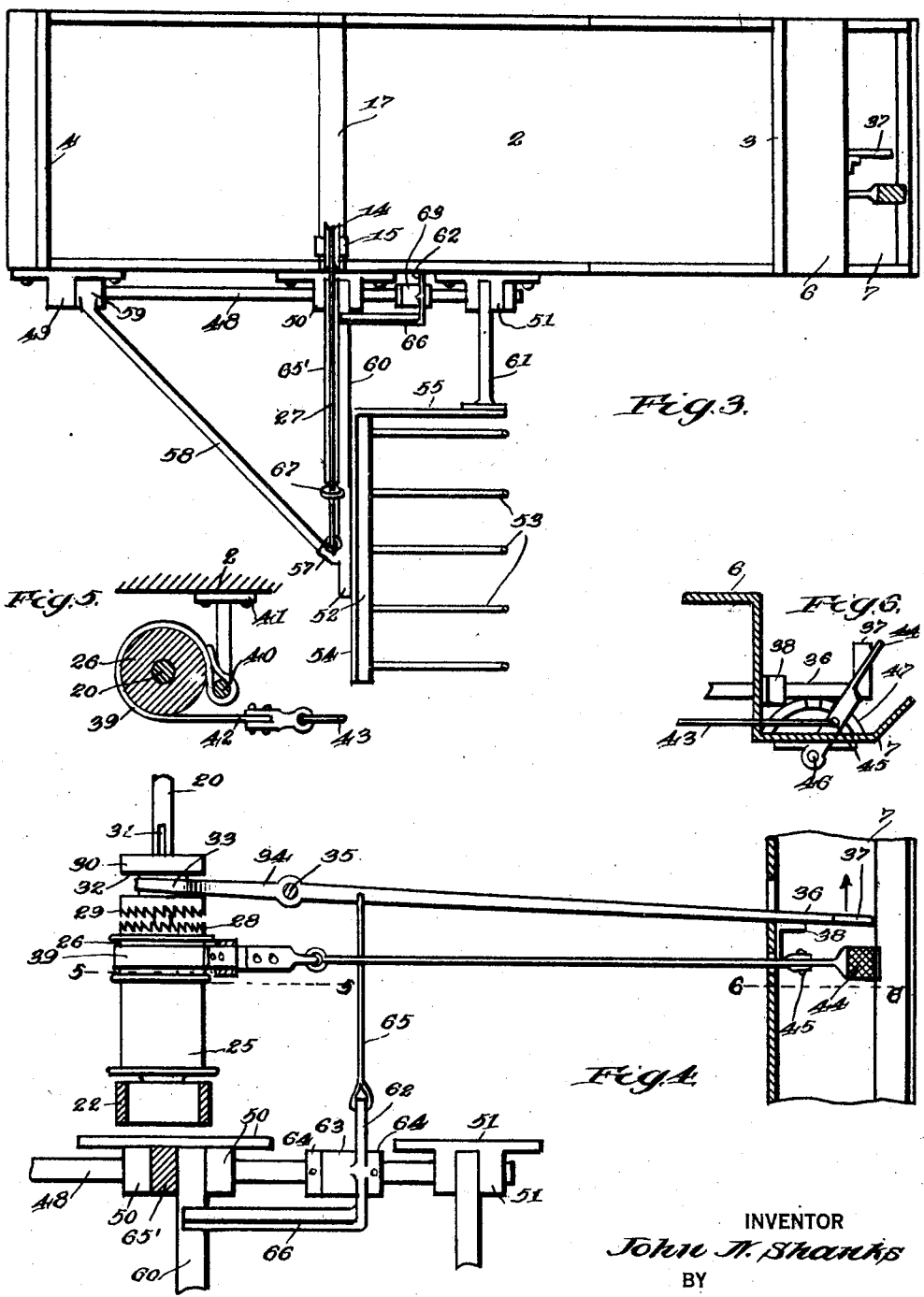

Patented Aug. 28, 1928.

1,682,352

UNITED STATES PATENT OFFICE.

JOHN N. SHANKS, OF POST FALLS, IDAHO, ASSIGNOR TO EMPIRE THRESHER CO., OF POST FALLS, IDAHO, A CORPORATION OF IDAHO.

SELF-LOADING VEHICLE.

Application filed May 5, 1926. Serial No. 106,952. Renewed April 9, 1928.

This invention relates to improvements in self loading vehicles.

One of the primary objects of this invention is to provide a vehicle which is adapted to be advanced in a field and which is provided with means for picking up and discharging a complete shock of grain onto the vehicle so that when the latter has acquired a load, it can be drawn or propelled to a point of deposition for such load.

It is a feature of my invention to provide the device of my invention with means, in the general form of a fork, which is adapted to pick up and discharge most any form of bulky material such as hay, or the like, which is not usually bound into units, as is the case with sheaves of grain.

A further feature consists in employing a portion of the tractive power of the vehicle as an operating means, or to operate means for causing elevation of the material to be discharged onto the vehicle.

A further feature consists in providing automatically acting means for releasing the elevated fork just at the time that such fork has discharged its contents so that the fork will be free to descend to a ground or pick-up position.

A further object is to provide means whereby after the elevated fork has reached a discharging position, the same may be held in such position, or its descent can be retarded.

My invention has many other features and objects which will be more fully described in connection with the accompanying drawings and which will be more particularly pointed out in and by the appended claim.

In the drawings:—

Fig. 1 is a view in side elevation of the most approved form of my invention showing the fork in a pick-up position.

Fig. 2 is a sectional view on line 2—2 of Fig. 1.

Fig. 3 is a plan view thereof.

Fig. 4 is an enlarged plan view of the fork operating means showing the lateral relation thereof to the fork.

Fig. 5 is a sectional view on line 5—5 of Fig. 4.

Fig. 6 is a sectional view on line 6—6 of Fig. 4.

Like characters of reference designate similar parts throughout the different figures of the drawings.

I have shown the device of my invention in the form of a horse drawn vehicle although it could be applied with equal facility to a motor driven vehicle. As illustrated, 1 designates the frame on which a suitable rack is mounted, consisting of a floor 2, front and rear rack ends 3 and 4, respectively, and side rack bars 5. A driver's seat is shown at 6, with a foot board at 7.

The running gear comprises front wheels 8, turnable about the usual fifth wheel 9, and rear bearing or supporting wheels 10. The rear wheels 10, are disposed or fixed on an axle 11, preferably, and the ends of the axle 11, are rotatively journalled in bracket bearings 12, secured to the frame 1. I have shown a chain sprocket wheel 13, fixed on axle 11, the purpose of which will be presently described. A fork elevating pulley 14, is shown journalled at 15, on a post 16, which is suitably braced at 17 and 18. In order to assure complete discharge of the fork contents into or onto the rack of the vehicle, I provide a slide guard 19, which is mounted on bars 5 and 6, as shown in Figs. 1 and 2, and which overhangs the vehicle rack, as clearly illustrated in the latter figure.

Reference will next be made to my improved mechanism for elevating the fork and performing other functions in connection therewith.

A clutch shaft 20, is rotatively journalled in bearings 22, pendent from frame 1, and arranged to dispose shaft 20, somewhat forwardly of and in parallel relation with axle 11. A sprocket wheel 23, is fixed on clutch shaft 20, and a chain 24 is trained about said wheels. Thus, broadly speaking the clutch shaft is in driven relation with axle 11 and will be rotated thereby whenever the vehicle is advanced. There will be ample tractive power from wheels 10, to insure enough power for the purposes of performing functions that will presently be described. A windless drum 25, is loosely mounted on shaft 20 and is provided with a brake drum 26, preferably formed integral therewith. An elevating cable 27, is trained over pulley 14, and has one end fixed to said drum 26, and is adapted to be wound up thereon, for a portion of its length. I have shown a clutch, which may be of the toothed type, one set of teeth thereof being shown at 28, as being formed on or attached to the brake drum 26. The companion set 29, is shown formed on a clutch member 30, which is keyed to shaft 20, as shown at 31, and is slidable lengthwise thereof into and out of coacting relation with the teeth 28. I have shown member 30, provided with an annular groove 32, adapted to receive the forked end 33, of a clutch actuating lever 34, which is adapted to swing horizontally about a vertically disposed stud 35, mounted in any suitable fixed manner. The forward end 36, may extend, as desired, adjacent foot board 7, so that the driver can engage the end 37, and force the same in the direction of the arrow to throw the clutch into operation. A stop 38, which may be fixed to the foot board, limits movement of the lever toward or in a clutch opening direction, as shown in Fig. 4.

A brake band 39, is trained about drum 26, and one end is shown anchored at 40, to a fixed support 41. The other end 42, is connected with a cable or rod 43, which extends forwardly and is secured to a foot lever 44, at 45. This lever 44, is shown pivoted at 46. It will be seen that by forcing this lever 44, toward the right of Fig. 5, that a brakage application will be made. If desired, any well known device can be employed to hold lever 44, in any degree of braking adjustment, such as the quadrant 47.

Reference will next be made to my improved material elevating and dumping mechanism.

In the most approved form of my invention, there is employed a rock shaft, or a shaft about the axis of which several elements turn, and I have designated such shaft at 48, the same being journalled in bearings 49 to 51, to rock alongside the vehicle, as clearly shown. My improved fork consists of a back 52, from which tines 53, extend forwardly. When the device of my invention is employed in connection with loose and bulky material such as hay or grain, I provide a back guard 54, and I also provide an inner guard 55, the latter of which may be a bent extension of the former. The inner guard also functions to prevent premature discharge from the fork and acts as an inclined slide when the fork has attained such a degree of inversion as to effect gravity discharge. The back 52, has a bracket 56, to which the lower end of cable 27, is connected. Said back also has a socket 57 for attachment thereto of the front end of an angularly disposed reach rod 58, the rear end of which is fixed to a hub 59, that abuts against bearing 49 and rotates with the remainder of the fork structure, about the axis of shaft 48. A main fork arm is indicated at 60, the outer lower end being fixed to back 52, in rigid connection therewith, and the upper and inner end being pivoted to the vehicle by being secured to said shaft 48. The guard 55, also has an arm 61, secured thereto as shown and being connected with shaft 48, so that the entire fork structure is braced and pivotally mounted in such a manner that it cannot get out of alinement. In the present construction, I have shown all the fork structure arms fixed to said shaft 48, so that the latter will turn in its bearings when the fork structure is swung, but although this is an advantage, it is not an essential feature.

I have provided means for automatically un-clutching the fork elevating mechanism, and a part of said means consists, as shown, of an arm 62, mounted on hub 63, which latter is loose on shaft 48 and is held against longitudinal movement thereon by collars 64, fixed on shaft 48. Arm 62 is connected by a line or cable 65, with lever 34, so that when a pull is exercised on cable 65, the lever 34, will be shifted into the un-clutching position shown in Fig. 4. Said hub 63, is provided with a throw-out arm 66, which extends into a position in advance of fork arm 60, so that when the fork reaches a dumping or discharge position, it will have acted through arm 60, to rotate hub 63, in a clock-wise direction, viewing Fig. 2, to pull lever 34 into an un-clutching position.

It will be seen that if the cable 27, extended in a straight line from its connection at 56, to pulley 14, that the leverage would be unfavorable as regards elevation of the fork. Hence, I have provided novel means for extending the cable, or rather a bight portion thereof so that the pull will be in a substantially straight line from the object lifted.

As shown, such means is in the form of boom or cable leverage reach arm 65', the lower end of which is freely mounted on shaft 48. The upper and outer end of said boom 66, is slidably connected with the cable 27, preferably by means of an eye 67, through which the cable slides. In order not to permit the boom 65', to descend too far, or not substantially farther than shown in Fig. 2, a limiting line 68, which may be a small cable, is connected with the boom 65' and with the vehicle at 69. To prevent the fork from descending too far, I provide means which may be in the form of a stop line 70, which may be a cable, and which is connected with the fork at 71, and with the boom at 72. It will be clear that when the parts are in the position shown in Fig. 2, the boom 65 and the fork, will be arrested from further downward movement.

It is believed that the operation will be clear from the foregoing but it may be briefly recapitulated.

Assuming that the fork had scooped a load, the driver would use his foot and shift the end 37, of lever 34, in the direction of the arrow and close the clutch. This would wind up cable 27 on drum 25, and elevate the fork. The boom 65, after the line 68 slackens, becomes a floating element and takes the position of least resistance. If it reaches a position adjacent the vehicle, it will be brought to a position of rest thereby and the cable will slide through eye 67, until the fork has reached a position near the part 16. At this point, the contents of the fork will fall by gravity over the top of guard 55, and will be prevented by guard 19, from falling on the ground, and will be guided by the latter onto the vehicle rack. When the fork reaches a maximum elevated position, or rather just prior to reaching such position, the arm 60 will engage arm 66, and begin to rock the latter and by the time the fork has finally reached its maximum elevated position, the arm 62, will have shifted lever 34 into the position shown in Fig. 4. This will release the fork automatically and permit the fork to descend by gravity into the ground pick-up position shown in Fig. 2. It will be noted that it is not necessary for the driver to turn his head and see if the fork is operating correctly, and further, he need not be concerned about release of the fork after the latter has dumped its load.

However, suppose the rack had been filled and it was desired to draw the same to a point of deposition for the acquired load, then, and in that event, it would not be desirable for the fork to occupy a ground position but rather an elevated position. Thus, in dumping the last fork full, the driver, when the fork had reached a dumping position, would depress lever 44, and thereby apply brakage, so that the fork could be held in an elevated position. In some cases, where the fork mechanism is very heavy, it is desirable to employ the braking means shown to retard the descent of the fork and prevent jolting.

It is believed that the device of my invention will be fully understood from the foregoing description, and while I have herein-shown and described one specific form of my invention, I do not wish to be limited thereto except for such limitations as the claim may import.

I claim:—

In a self loading vehicle mechanism, a vehicle having a running gear, a rock shaft journalled alongside said vehicle, a fork having an arm mounted to swing on said rock shaft, said fork having an inner load guard provided with an arm mounted to swing on said rock shaft, an angularly disposed reach arm having its forward end fixed to said fork and its rear end journalled on said rock shaft, and mechanism operated from said axle for elevating said fork from a ground pick-up to a position for discharging the load of the fork onto said vehicle.

In testimony that I claim the foregoing as my own, I hereby affix my signature.

JOHN N. SHANKS.